US012646641B2

(12) United States Patent
Miyazawa et al.

(10) Patent No.: US 12,646,641 B2
(45) Date of Patent: Jun. 2, 2026

(54) SOFT MAGNETIC ALLOY RIBBON AND MAGNETIC CORE

(71) Applicant: SEIKO EPSON CORPORATION, Tokyo (JP)

(72) Inventors: Hiromu Miyazawa, Azumino (JP); Kinya Ozawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 992 days.

(21) Appl. No.: 17/865,732

(22) Filed: Jul. 15, 2022

(65) Prior Publication Data

US 2023/0026583 A1 Jan. 26, 2023

(30) Foreign Application Priority Data

Jul. 16, 2021 (JP) ................................ 2021-117937

(51) Int. Cl.

| | |
|---|---|
| ***H01F 1/147*** | (2006.01) |
| ***C21D 10/00*** | (2006.01) |
| ***C22C 38/02*** | (2006.01) |
| ***H01F 3/04*** | (2006.01) |
| ***H01F 27/25*** | (2006.01) |

(52) U.S. Cl.

CPC ........... *H01F 1/147* (2013.01); *C21D 10/005* (2013.01); *C22C 38/02* (2013.01); *C22C 2202/02* (2013.01); *H01F 3/04* (2013.01); *H01F 27/25* (2013.01)

(58) Field of Classification Search

USPC ........................................ 336/233, 218, 213

See application file for complete search history.

(56) References Cited

U.S. PATENT DOCUMENTS

| | | | | |
|---|---|---|---|---|
| 9,978,497 B2 * | 5/2018 | Azuma | ............... | H01F 41/0206 |
| 2016/0035474 A1 * | 2/2016 | Azuma | ............. | B23K 26/0622 29/605 |
| 2017/0040849 A1 * | 2/2017 | Lin | .......................... | H02K 1/02 |

(Continued)

FOREIGN PATENT DOCUMENTS

| | | | | |
|---|---|---|---|---|
| CN | 111183571 A * | 5/2020 | ............... | H02K 1/16 |
| CN | 112582148 A * | 3/2021 | ............ | H01F 27/25 |

(Continued)

*Primary Examiner* — Shawki S Ismail
*Assistant Examiner* — Joselito S. Baisa
(74) *Attorney, Agent, or Firm* — Harness, Dickey & Pierce, P.L.C.

(57) ABSTRACT

A soft magnetic alloy ribbon is made of a Fe-based soft magnetic alloy and includes a first laser peening trace row and a second laser peening trace row each of which includes a plurality of laser peening traces in a row in a first direction and which are arranged adjacent to each other in a second direction intersecting the first direction, and a domain wall extending in a third direction, in which D0<D1 where a straight line at an equal separation distance from the first laser peening trace row and the second laser peening trace row is defined as a central line, a straight line which has a first distance where a distance from the first laser peening trace row is shorter than the separation distance is defined as a first reference line, a width of the domain wall at a position intersecting the central line is defined as D0, and a width of the domain wall at a position intersecting the first reference line is defined as D1.

6 Claims, 7 Drawing Sheets

(56) References Cited

U.S. PATENT DOCUMENTS

| | | | | |
|---|---|---|---|---|
| 2020/0234870 | A1* | 7/2020 | Aoki | H01F 1/18 |
| 2021/0057133 | A1* | 2/2021 | Itagaki | H01F 27/25 |
| 2021/0098175 | A1* | 4/2021 | Nakajima | H01F 41/0226 |

FOREIGN PATENT DOCUMENTS

| | | | | | |
|---|---|---|---|---|---|
| CN | 115620983 | A | * | 1/2023 | H01F 3/04 |
| JP | 2012087332 | A | * | 5/2012 | |
| JP | 2012-199506 | A | | 10/2012 | |
| WO | WO-2019070054 | A1 | * | 4/2019 | H02K 1/16 |
| WO | WO-2019189813 | A1 | * | 10/2019 | C22C 45/02 |

* cited by examiner

SOFT MAGNETIC ALLOY RIBBON AND MAGNETIC CORE

The present application is based on, and claims priority from JP Application Serial Number 2021-117937, filed Jul. 16, 2021, the disclosure of which is hereby incorporated by reference herein in its entirety.

BACKGROUND

1. Technical Field

The present disclosure relates to a soft magnetic alloy ribbon and a magnetic core.

2. Related Art

JP-A-2012-199506 discloses a soft magnetic alloy ribbon which is manufactured by a rapid solidification method and which includes, on a surface, a concave portion formed by irradiation with a laser beam and a protruding portion formed around the concave portion. JP-A-2012-199506 further discloses a tape-wound magnetic core formed by winding the soft magnetic alloy ribbon such that the concave portion is on the outside.

When the soft magnetic alloy ribbon is subjected to a heat treatment while applying a magnetic field in a longitudinal direction, magnetic domains generated along the longitudinal direction are formed antiparallel with a 180° domain wall sandwiched between the magnetic domains.

Here, when the soft magnetic alloy ribbon is irradiated with the laser beam in advance, finer magnetic domains are formed as compared with a case without irradiation with the laser beam. That is, due to the irradiation with the laser beam, refinement of the magnetic domains with the heat treatment becomes remarkable. By the refinement of the magnetic domains in this way, it is possible to reduce an eddy current loss and obtain a magnetic core with a low iron loss.

JP-A-2012-199506 further discloses that the iron loss can be particularly reduced by optimizing a height of the protruding portion and a ratio of a depth of the concave portion to a thickness of the ribbon.

JP-A-2012-199506 discloses an optimum condition for the irradiation with the laser beam, that is, the depth of the concave portion and the height of the protruding portion formed by a laser scribe treatment. However, the refinement of the magnetic domains is greatly influenced by an alloy composition of the ribbon and mechanical properties of the ribbon associated with the alloy composition. Consequently, it may not be possible to sufficiently refine the magnetic domains only by optimizing the conditions in the laser scribe treatment. Thus, it is required to refine the magnetic domains regardless of the alloy composition of the ribbon.

SUMMARY

A soft magnetic alloy ribbon according to an application example of the present disclosure is a ribbon made of a Fe-based soft magnetic alloy and includes: a first laser peening trace row and a second laser peening trace row each of which includes a plurality of laser peening traces in a row in a first direction and which are arranged adjacent to each other in a second direction intersecting the first direction; and a domain wall extending in a third direction intersecting the first direction, in which $D0<D1$ where a straight line at an equal separation distance from the first laser peening trace row and the second laser peening trace row is defined as a central line, a straight line which is located on a central line side of the first laser peening trace row and has a first distance where a distance from the first laser peening trace row is shorter than the separation distance is defined as a first reference line, a width of the domain wall at a position intersecting the central line is defined as D0, and a width of the domain wall at a position intersecting the first reference line is defined as D1.

A magnetic core according to an application example of the present disclosure includes the soft magnetic alloy ribbon according to the application example of the present disclosure.

DESCRIPTION OF EXEMPLARY EMBODIMENTS

Figure 1:
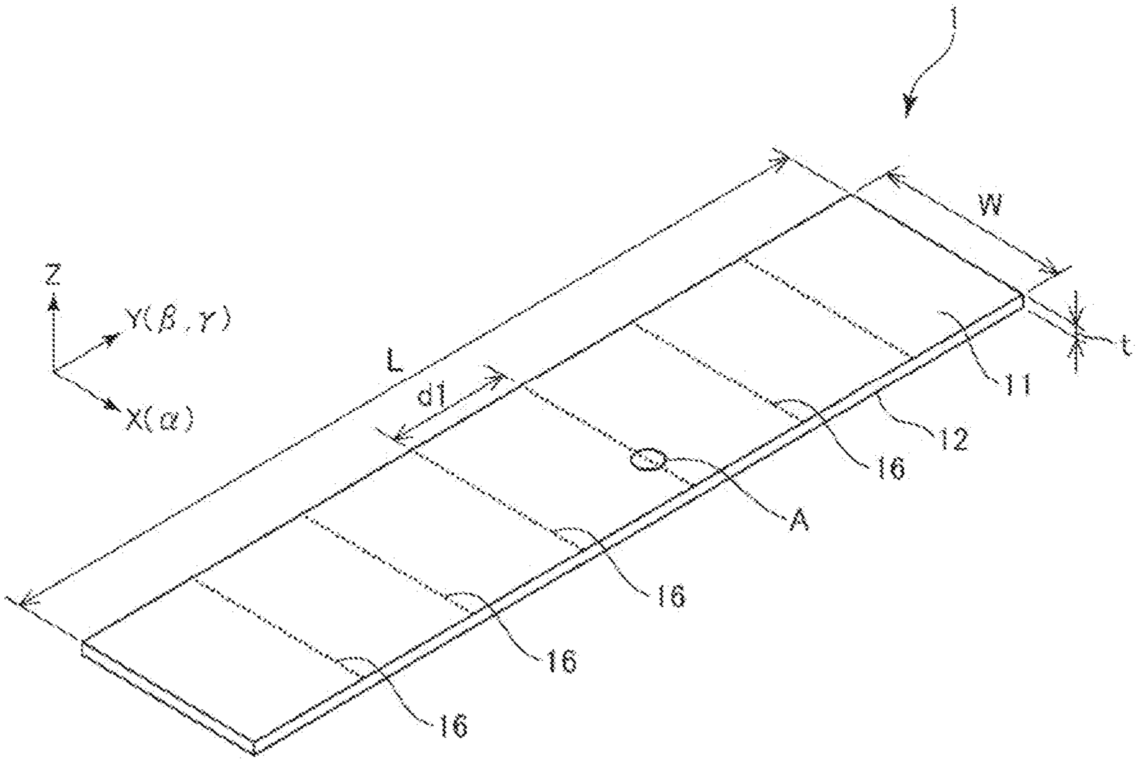
FIG. 1 is a perspective view schematically showing a soft magnetic alloy ribbon according to an embodiment.

Hereinafter, a soft magnetic alloy ribbon and a magnetic core according to the present disclosure will be described in detail based on preferred embodiments shown in the drawings.

1. Soft Magnetic Alloy Ribbon

The soft magnetic alloy ribbon according to the embodiment is a ribbon made of a soft magnetic alloy. The soft magnetic alloy is an alloy exhibiting soft magnetism. For example, a plurality of soft magnetic alloy ribbons are laminated to form a laminated body. Such a laminated body is used for a magnetic core of a transformer, for example.

Figure 2:
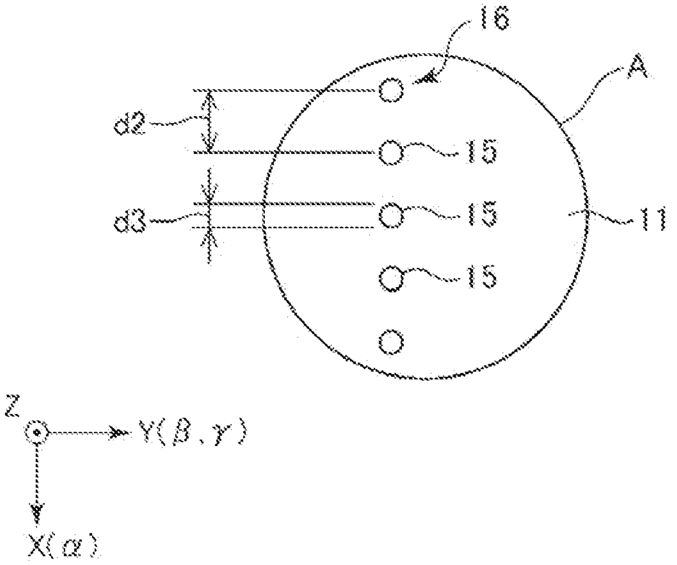
FIG. 2 is an enlarged view of a portion A in FIG. 1.

FIG. 1 is a perspective view schematically showing the soft magnetic alloy ribbon according to the embodiment. FIG. 2 is an enlarged view of a portion A in FIG. 1. In FIG. 1, a width direction of a soft magnetic alloy ribbon 1 is X, a length direction thereof is Y, and a thickness direction thereof is Z. In FIG. 1, the three directions are indicated by arrows. Each direction described below includes both a direction from a proximal end to a distal end of the arrow and a direction from the distal end to the proximal end of the arrow.

In FIG. 1, a length of the soft magnetic alloy ribbon 1 is L, a width thereof is W, and a thickness thereof is t.

The ribbon refers to one having a shape having a first surface 11 and a second surface 12 that have a front-to-back relation with each other, in which a distance between the first surface 11 and the second surface 12, that is, the thickness t of the soft magnetic alloy ribbon 1, is sufficiently shorter than the length L and width W of the soft magnetic alloy ribbon 1.

The thickness t of the soft magnetic alloy ribbon 1 is not particularly limited, and is preferably 1 μm or more and 40 μm or less, and more preferably 5 μm or more and 30 μm or less. The soft magnetic alloy ribbon 1 having such a thickness t has both sufficient mechanical strength and reduction in eddy current loss. Accordingly, it is possible to implement a soft magnetic alloy ribbon 1 which can be wound with a small bending radius and from which a small magnetic core with a low iron loss can be prepared.

Since the width W of the soft magnetic alloy ribbon 1 is often determined by manufacturing devices and manufacturing methods of the soft magnetic alloy ribbon 1, the width W is not particularly limited, and is preferably 5 mm or more, more preferably 10 mm or more and 500 mm or less, and still more preferably 20 mm or more and 300 mm or less.

Since the length L of the soft magnetic alloy ribbon 1 is determined at the time of manufacturing the soft magnetic alloy ribbon 1, the length L is not particularly limited as long as it is longer than the width W of the soft magnetic alloy ribbon 1. When the soft magnetic alloy ribbon 1 is used for winding up to manufacture a magnetic core, as an example, the length L of the soft magnetic alloy ribbon 1 is preferably 5 times or more, and more preferably 10 times or more the width W of the soft magnetic alloy ribbon 1.

Examples of the soft magnetic alloy include Fe-based soft magnetic alloys such as Fe—Si—B based, Fe—Si—B—C based, Fe—Si—B—Cr—C based, Fe—Si—Cr based, Fe—B based, Fe—B—C based, Fe—P—C based, Fe—Co—Si—B based, Fe—Si—B—Nb based, Fe—Si—B—Nb—Cu based, and Fe—Zr—B based alloys. The Fe-based soft magnetic alloy is excellent in soft magnetism and has a high saturation magnetic flux density, and is thus useful as a constituent material of the soft magnetic alloy ribbon 1 used for the magnetic core or the like.

The soft magnetic alloy may contain nanocrystals. The nanocrystals refer to crystal structures with a grain size of 1.0 nm or more and 30.0 nm or less. When such nanocrystals are contained, the soft magnetism of the soft magnetic alloy can be further improved. That is, it is possible to implement a soft magnetic alloy ribbon 1 that has both low coercive force and high magnetic permeability.

In the soft magnetic alloy ribbon 1, it is preferable that the above nanocrystals are contained in a total ratio of 50% by volume or more, and more preferably 70% by volume or more. Accordingly, a soft magnetic alloy ribbon 1 exhibiting particularly satisfactory soft magnetism can be obtained. In addition, the soft magnetic alloy ribbon 1 may contain a crystalline structure. The crystalline structure refers to a structure containing crystal grains having a grain size of more than 30.0 nm.

As the Fe-based soft magnetic alloy, among the above-mentioned series, the Fe—Si—B based alloy or the Fe—Si—B—C based alloy is particularly preferably used. The Fe—Si—B-based alloy is made of Fe, Si, B, and impurities. The Fe—Si—B-based alloy has a chemical composition in which, when the total content of Fe, Si, and B is 100 atomic %, a Fe content is 78 atomic % or more, a B content is 11 atomic % or more, and the total content of Si and B is 17 atomic % or more and 22 atomic % or less.

Fe is a metal element having a large magnetic moment and influences the magnetic flux density of the soft magnetic alloy ribbon 1. The Fe content is preferably 78 atomic % or more and 82 atomic % or less.

Si and B influence amorphous-forming ability of the Fe-based soft magnetic alloys. The Si content is preferably 2.0 atomic % or more and 6.0 atomic % or less, and more preferably 3.5 atomic % or more and 6.0 atomic % or less. The B content is preferably 12 atomic % or more and 16 atomic % or less, and more preferably 13 atomic % or more and 16 atomic % or less. As described above, the total content of Si and B is preferably 17 atomic % or more and 22 atomic % or less.

In the Fe-based soft magnetic alloy having such a chemical composition, in particular, by setting the Fe content within the above range, it is possible to improve the magnetic flux density while improving the amorphous-forming ability. Thus, it is possible to implement a soft magnetic alloy ribbon 1 which exhibits excellent soft magnetism derived from amorphous substances or nanocrystals formed from amorphous substances and has a high saturation magnetic flux density. In particular, by setting the total content of Si and B within the above range, it is also possible to implement a soft magnetic alloy ribbon 1 in which the iron loss is sufficiently reduced.

The soft magnetic alloy ribbon 1 according to the embodiment, as shown in FIGS. 1 and 2, has a laser peening trace row 16 which is provided on the first surface 11 and which includes a plurality of laser peening traces 15 arranged in a row.

In the present specification, the direction in which the laser peening traces 15 form a row is referred to as a "first direction α". In the present embodiment, as an example, the first direction α and the width direction X are parallel to each other. In the present specification, the term "parallel" means a state where an angle between two directions is 10° or less. However, the relation between the first direction α and the width direction X is not limited to this, and the first direction α may be non-parallel to the width direction X.

As shown in FIG. 1, the soft magnetic alloy ribbon 1 further has a plurality of laser peening trace rows 16. The plurality of laser peening trace rows 16 shown in FIG. 1 are arranged in a second direction β intersecting the first direction α. In the present embodiment, as an example, the second direction β is orthogonal to the first direction α. However, the relation between the first direction α and the second direction β is not limited to this, and an intersection angle between the first direction α and the second direction β is preferably 60° or more and 90° or less, and more preferably 75° or more and 90° or less. The intersection angle between the first direction α and the second direction β is the smallest angle between the first direction α and the second direction β.

Figure 3:
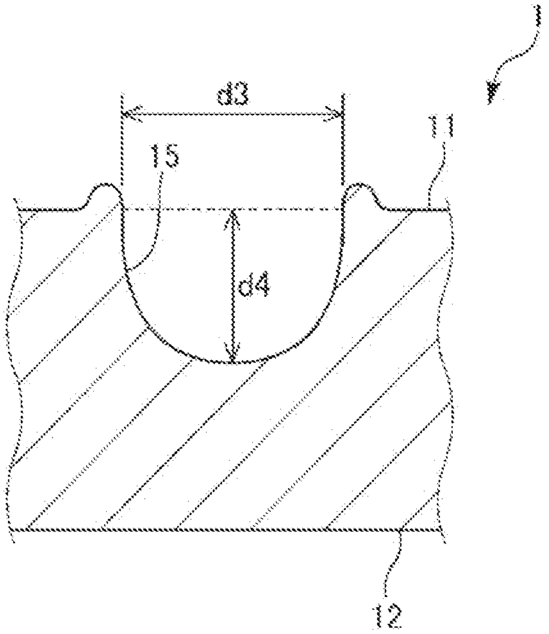
FIG. 3 is a cross-sectional view of a laser peening trace shown in FIG. 2.
Figure 4:
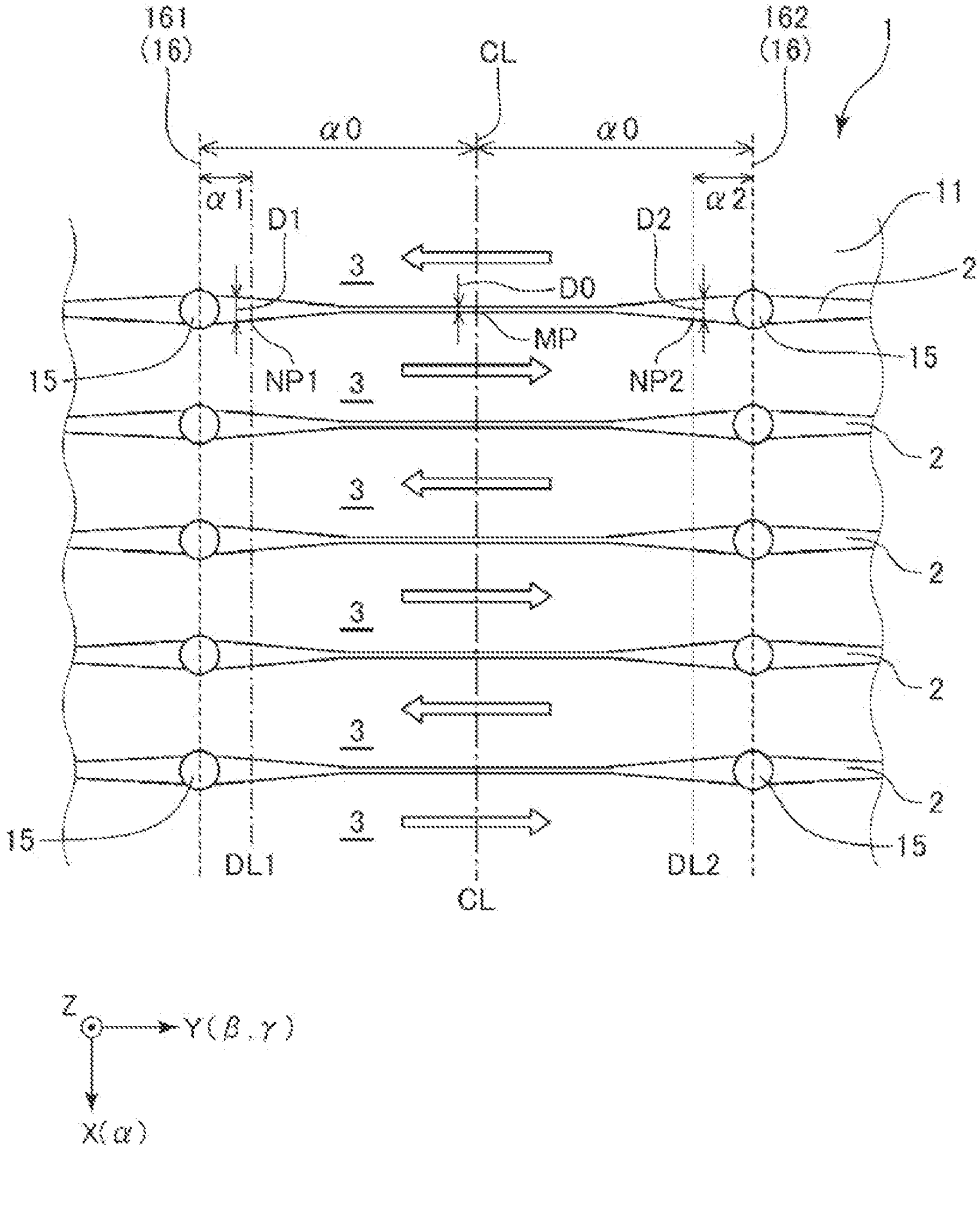
FIG. 4 is an enlarged plan view showing a first surface of the soft magnetic alloy ribbon shown in FIG. 1, and is a diagram schematically showing magnetic domains and domain walls of the soft magnetic alloy ribbon.

FIG. 3 is a cross-sectional view of the laser peening trace 15 shown in FIG. 2. FIG. 4 is an enlarged plan view showing the first surface 11 of the soft magnetic alloy ribbon 1 shown in FIG. 1, and is a diagram schematically showing magnetic domains 3 and domain walls 2 of the soft magnetic alloy ribbon 1.

As shown in FIG. 2, in the laser peening trace row 16, the laser peening traces 15 each forming a substantially circular shape in a plan view are arranged in a row along the first direction α. In the present specification, a straight line drawn to connect centers of the laser peening traces 15 arranged in a row along the first direction α is defined as the laser peening trace row 16. When the center positions are not arranged in a row and are slightly uneven, a straight line drawn at positions where a deviation is evened out is defined as the laser peening trace row 16.

The laser peening trace 15 is a processing trace formed by irradiating the first surface 11 with a laser beam, and refers to a concave portion as shown in FIG. 3 obtained by melting the soft magnetic alloy by receiving the energy of the laser beam. A treatment of forming the laser peening trace 15 is called a laser scribe treatment.

As shown in FIG. 4, the soft magnetic alloy ribbon 1 further has the domain walls 2. Each of the domain walls 2 extends linearly along a third direction γ intersecting the first direction α. In the present embodiment, as an example, the third direction γ and the first direction α are orthogonal to each other. Thus, in the present embodiment, the third direction γ is parallel to the second direction β. However, the relation between the first direction α and the third direction γ is not limited to this, and the third direction γ may be non-parallel to the second direction β. An intersection angle between the first direction α and the third direction γ is preferably 60° or more and 90° or less, and more preferably 75° or more and 90° or less. The intersection angle between the first direction α and the third direction γ refers to the smallest angle between the first direction α and the third direction Y.

The domain walls 2 are located at boundaries between adjacent magnetic domains 3 in the second direction β. The magnetic domains 3 shown in FIG. 4 each have a ribbon shape having a long axis along the first direction α. Since the soft magnetic alloy ribbon 1 has a large number of domain walls 2, the magnetic domains 3 are refined, that is, the magnetic domains 3 are further finely divided. As a result, the domain walls 2 are easier to move under an AC magnetic field, and the eddy current loss in the soft magnetic alloy ribbon 1 can be reduced. In addition, since the magnetic domains 3 have a shape having a long axis along the first direction α, an axis of easy magnetization exists along the first direction α, and an axis of difficult magnetization exists in a direction orthogonal to the first direction α.

Hereinafter, the laser peening trace 15 and the domain wall 2 will be described in more detail.

1.1. Laser Peening Trace 1.1.1. Line Spacing

A spacing between the laser peening trace rows 16 shown in FIG. 1 is defined as a line spacing d1. The line spacing d1 is preferably 1 mm or more and 40 mm or less, more preferably 1 mm or more and 30 mm or less, and still more preferably 2 mm or more and 20 mm or less. When the line spacing d1 is within the above range, an arrangement density of the laser peening trace rows 16 in the soft magnetic alloy ribbon 1 can be optimized. As a result, the magnetic domains 3 can be satisfactorily refined, and the iron loss of the soft magnetic alloy ribbon 1 can be further reduced.

When the line spacing d1 is below the lower limit value, depending on conditions such as the composition of the soft magnetic alloy, amorphous substances contained in the soft magnetic alloy ribbon 1 crystallize or the nanocrystals become enlarged, and the soft magnetism decreases, resulting in an increase in iron loss of the soft magnetic alloy ribbon 1. On the other hand, when the line spacing d1 exceeds the upper limit value, depending on other arrangement conditions of the laser peening traces 15 and the laser peening trace rows 16, the refinement of the magnetic domains 3 may be insufficient, and the iron loss of the soft magnetic alloy ribbon 1 may not be sufficiently reduced.

Adjacent laser peening trace rows 16 are preferably substantially parallel, but may be non-parallel. The laser peening trace rows 16 may also have parallel portions and non-parallel portions.

The first direction α shown in FIG. 1 is parallel to the width direction X as described above, but non-parallel portions may be mixed.

The line spacing d1 is a distance between the centers of the laser peening traces 15 measured in a middle portion of the width W of the soft magnetic alloy ribbon 1. The middle portion refers to a region having a width half the width W centered on a midpoint of the width W. Thus, the laser peening trace row 16 may extend over the entire width W or only a part of the width W of the soft magnetic alloy ribbon 1 as long as at least a part of the laser peening trace row 16 is provided in the middle portion.

The spacing between the laser peening trace rows 16 may be constant in the entire soft magnetic alloy ribbon 1 or partially different in the soft magnetic alloy ribbon 1. That is, when the spacing between the laser peening trace rows 16 is measured at a plurality of locations in the middle portion of the width W of one soft magnetic alloy ribbon 1, the measured values may be the same as or different from each other. In the latter case, an average value of five measured values is the line spacing d1 of the soft magnetic alloy ribbon 1.

The laser peening traces 15 may be provided on only one of the first surface 11 and the second surface 12, or may be provided on both the surfaces. When the laser peening traces 15 are provided on both the surfaces, the range of the line spacing d1 may be satisfied in a state where the laser peening traces 15 provided on the second surface 12 are projected onto the first surface 11 and the projected laser peening traces 15 and the laser peening traces 15 provided on the first surface 11 match each other.

1.1.2. Spot Spacing

A spacing between the laser peening traces 15 in the laser peening trace row 16 shown in FIG. 1 is defined as a spot spacing d2. The spot spacing d2 is set shorter than the line spacing d1 described above, and is preferably 1.0 mm or less, more preferably 0.10 mm or more and 1.0 mm or less, still more preferably 0.15 mm or more and 0.75 mm or less, and particularly preferably 0.20 mm or more and 0.50 mm or less. When the spot spacing d2 is within the above range, the arrangement density of the laser peening traces 15 in the laser peening trace row 16 can be optimized. As a result, the magnetic domains 3 can be satisfactorily refined, and the iron loss of the soft magnetic alloy ribbon 1 can be further reduced.

When the spot spacing d2 is below the lower limit value, depending on conditions such as the composition of the soft magnetic alloy, an area in which the amorphous substances contained in the soft magnetic alloy ribbon 1 crystallize or the nanocrystals become enlarged increases, and the soft magnetism decreases, resulting in the increase of the iron loss of the soft magnetic alloy ribbon 1. On the other hand, when the spot spacing d2 exceeds the upper limit value, depending on other arrangement conditions of the laser peening traces 15 and the laser peening trace rows 16, the refinement of the magnetic domains 3 may be insufficient, and the iron loss of the soft magnetic alloy ribbon 1 may not be sufficiently reduced.

The spot spacing d2 is a distance between the centers of adjacent laser peening traces 15 in one laser peening trace row 16 measured in the middle portion of the width W of the soft magnetic alloy ribbon 1. The center of the laser peening trace 15 is center of a perfect circle inscribed in the laser peening trace 15.

The spacing between the laser peening traces 15 may be constant in the entire soft magnetic alloy ribbon 1 or partially different in the soft magnetic alloy ribbon 1. That is, when the spacing between the laser peening traces 15 are measured at a plurality of locations in the middle portion of the width W of one soft magnetic alloy ribbon 1, the measured values may be the same as or different from each other. In the latter case, an average value of five measured values is the spot spacing d2 of the soft magnetic alloy ribbon 1.

When the laser peening traces 15 are provided on both the first surface 11 and the second surface 12, the range of the spot spacing d2 may be satisfied in a state where the laser peening traces 15 provided on the second surface 12 are projected onto the first surface 11 and the projected laser peening traces 15 and the laser peening traces 15 provided on the first surface 11 match each other.

1.1.3. Spot Diameter

A diameter of the laser peening trace 15 shown in FIGS. 2 and 3 is defined as a spot diameter d3. The spot diameter d3 is preferably 0.010 mm or more and 0.30 mm or less, more preferably 0.020 mm or more and 0.25 mm or less, and still more preferably 0.030 mm or more and 0.20 mm or less. When the spot diameter d3 is within the above range, the magnetic domains 3 can be satisfactorily refined by the laser peening traces 15. It is also possible to reduce a decrease in mechanical strength of the soft magnetic alloy ribbon 1 due to the formation of the laser peening traces 15.

When the spot diameter d3 is below the lower limit value, depending on other arrangement conditions of the laser peening traces 15 and the laser peening trace rows 16, the refinement of the magnetic domains 3 may be insufficient, and the iron loss of the soft magnetic alloy ribbon 1 may not be sufficiently reduced. On the other hand, when the spot diameter d3 exceeds the upper limit value, the mechanical strength of the soft magnetic alloy ribbon 1 may decrease.

The spot diameter d3 is an average value of equivalent circle diameters of 10 or more laser peening traces 15 measured in the middle portion of the width W of the soft magnetic alloy ribbon 1. The equivalent circle diameter is the diameter of a perfect circle having the same area as the laser peening trace 15 when the first surface 11 is viewed in a plan view.

The equivalent circle diameters of the laser peening traces 15 may be the same as or different from each other.

1.1.4. Spot Depth

A depth of the laser peening trace 15 shown in FIG. 3 is defined as a spot depth d4. The spot depth d4 is preferably 0.0020 mm or more and 0.15 mm or less, more preferably 0.0030 mm or more and 0.10 mm or less, and still more preferably 0.0040 mm or more and 0.050 mm or less. When the spot depth d4 is within the above range, the magnetic domains 3 can be satisfactorily refined by the laser peening traces 15. It is also possible to reduce a decrease in mechanical strength of the soft magnetic alloy ribbon 1 due to the formation of the laser peening traces 15.

When the spot depth d4 is below the lower limit value, depending on other arrangement conditions of the laser peening traces 15 and the laser peening trace rows 16, the refinement of the magnetic domains 3 may be insufficient, and the iron loss of the soft magnetic alloy ribbon 1 may not be sufficiently reduced. On the other hand, when the spot depth d4 exceeds the upper limit value, the mechanical strength of the soft magnetic alloy ribbon 1 may decrease.

The spot depth d4 is an average value of the depths of 10 or more laser peening traces 15 measured in the middle portion of the width W of the soft magnetic alloy ribbon 1.

The depths of the laser peening traces 15 may be the same as or different from each other.

1.1.5. Number Density

By using the line spacing d1 [mm] and the spot spacing d2 [mm] in the soft magnetic alloy ribbon 1, a number density D of the laser peening traces 15 can be calculated. Specifically, the number density D of the laser peening traces 15 is indicated by (1/d1)×(1/d2). The number density D is an index indicating the arrangement density based on the number of the laser peening traces 15. The number density D of the laser peening trace 15 is preferably 0.05 pieces/mm$^2$ or more and 0.50 pieces/mm$^2$ or less, more preferably 0.10 pieces/mm$^2$ or more and 0.40 pieces/mm$^2$ or less, and still more preferably 0.15 pieces/mm$^2$ or more and 0.35 pieces/mm$^2$ or less. When the number density D is within the above range, the refinement of the magnetic domains 3 by the laser peening traces 15 can be further optimized, and the iron loss of the soft magnetic alloy ribbon 1 can be further reduced.

When the number density D is lower than the lower limit value, the iron loss of the soft magnetic alloy ribbon 1 may not be sufficiently reduced. On the other hand, when the number density D exceeds the upper limit value, when the soft magnetic alloy ribbon 1 is curved with a small bending radius, the soft magnetic alloy ribbon 1 may be easily damaged such as broken.

The number density D is calculated based on a region having a length in the length direction Y of 30 cm or more in the middle portion of the width W of the soft magnetic alloy ribbon 1 where the laser peening trace rows 16 are arranged. When the length L of the soft magnetic alloy ribbon 1 is less than 30 cm, the number density D is calculated based on the total length.

When the laser peening traces 15 are provided on both the first surface 11 and the second surface 12, the range of the number density D may be satisfied in a state where the laser peening traces 15 provided on the second surface 12 are projected onto the first surface 11 and the projected laser peening traces 15 and the laser peening traces 15 provided on the first surface 11 match each other.

1.2. Domain Wall

As described above, the soft magnetic alloy ribbon 1 has the domain walls 2. The relation between the position of the domain walls 2 and the position of the laser peening traces 15 is not particularly limited. In the present embodiment, as shown in FIG. 4, the domain walls 2 and the laser peening traces 15 are aligned with each other in the width direction X, but as described later, these positions may be misaligned from each other.

The domain wall 2 is a 180° domain wall. The 180° domain wall refers to a domain wall between adjacent magnetic domains when magnetization directions of the adjacent magnetic domains are opposite to each other. Thus, as shown in FIG. 4, adjacent magnetic domains 3 sandwiching the domain wall 2 have opposite magnetization directions. In FIG. 4, the magnetization directions of the magnetic domains 3 are indicated by white arrows. In FIG. 4, of the plurality of laser peening trace rows 16, two adjacent laser peening trace rows 16 are referred to as a first laser peening trace row 161 and a second laser peening trace row 162.

The domain walls 2 shown in FIG. 4 have partially different widths. A width of the domain wall 2 refers to a length of the domain wall 2 in a direction orthogonal to the third direction γ, that is, the first direction α in the present embodiment. Here, the width of the domain wall 2 at a middle position MP is defined as D0, the width of the domain wall 2 at a near position NP1 near the first laser peening trace row 161 is defined as D1, and the width of the domain wall 2 at a near position NP2 near the second laser peening trace row 162 is defined as D2. In the domain walls 2, a relation of D0<D1 is established.

By establishing such a relation, a distribution of the width of the domain wall 2 is optimized. Accordingly, as will be described in detail later, the iron loss of the soft magnetic alloy ribbon 1 can be reduced.

The middle position MP is a position where a central line CL, which has an equal separation distance α0 from the first laser peening trace row 161 and the second laser peening trace row 162, intersects the domain wall 2. The central line CL is a straight line drawn along the first direction α.

The near position NP1 is a position where a first reference line DL1 having a first distance α1 from the first laser peening trace row 161 intersects the domain wall 2. The first distance α1 is a distance shorter than the above-mentioned separation distance α0, and is a distance defined by α1=d2/2. The first reference line DL1 is a straight line drawn along the first direction α on the central line CL side of the first laser peening trace row 161. The d2 used in the definition of the first distance α1 is a spacing (spot spacing d2) between the laser peening traces 15 constituting the first laser peening trace row 161.

The near position NP2 is a position where a second reference line DL2 having a second distance α2 from the second laser peening trace row 162 intersects the domain wall 2. The second distance α2 is a distance shorter than the above-mentioned separation distance α0, and is a distance defined by α2=d2/2. The second reference line DL2 is a straight line drawn along the first direction α on the central line CL side of the second laser peening trace row 162. The d2 used in the definition of the second distance α2 is a spacing (spot spacing d2) between the laser peening traces 15 constituting the second laser peening trace row 162.

As described above, the soft magnetic alloy ribbon 1 according to the present embodiment is a ribbon made of a Fe-based soft magnetic alloy, and includes the first laser peening trace row 161, the second laser peening trace row 162, and the domain walls 2. The first laser peening trace row 161 and the second laser peening trace row 162 each include a plurality of laser peening traces 15 in a row in the first direction α, and are arranged next to each other in the second direction β intersecting the first direction α. The domain wall 2 extends in the third direction γ intersecting the first direction α.

In addition, the straight line having the equal separation distance α0 from the first laser peening trace row 161 and the second laser peening trace row 162 is defined as the central line CL. Further, the straight line which is located on the central line CL side of the first laser peening trace row 161 and has the first distance α1 where the distance from the first laser peening trace row 161 is shorter than the separation distance α0 is defined as the first reference line DL1.

When the width of the domain wall 2 at a position (middle position MP) intersecting the central line CL is defined as D0 and the width of the domain wall 2 at a position (near position NP1) intersecting the first reference line DL1 is defined as D1, the soft magnetic alloy ribbon 1 according to the present embodiment satisfies the relation of D0<D1.

By providing the domain walls 2 satisfying such a relation, the distribution of the width of the domain wall 2 is optimized in the soft magnetic alloy ribbon 1. That is, the distribution of the width of the domain wall 2 changes depending on the laser scribe treatment, but in the present embodiment, treatment conditions in the laser scribe treatment are set such that the distribution of the width of the domain wall 2 satisfies D0<D1. By optimizing the distribution of the width of the domain wall 2, the domain wall 2 can be easily moved due to an AC magnetic field. This is considered to be a phenomenon caused by optimization of a stress distribution. The stress generated in the soft magnetic alloy is considered to influence the width of the domain wall 2, and it is considered that a relatively large compressive stress is generated in a place where the domain wall 2 is wide, and a relatively small compressive stress is generated in a place where the domain wall 2 is narrow. By optimizing the stress distribution in this way, the energy required for AC magnetization is reduced, and the iron loss of the soft magnetic alloy ribbon 1 can be reduced.

As described above, the straight line which is located on the central line CL side of the second laser peening trace row 162 and has the second distance α2 where the distance from the second laser peening trace row 162 is shorter than the separation distance α0 is defined as the second reference line DL2. When the width of the domain wall 2 at the position (near position NP2) intersecting the second reference line DL2 is defined as D2, the soft magnetic alloy ribbon 1 according to the present embodiment satisfies the relationship of D0<D2.

By providing the domain walls 2 satisfying such a relation, the distribution of the width of the domain wall 2 is further optimized in the soft magnetic alloy ribbon 1. That is, in the present embodiment, the treatment conditions in the laser scribe treatment are set such that the distribution of the width of the domain wall 2 satisfies D0<D2. By optimizing the distribution of the width of the domain wall 2, the domain wall 2 can be easily moved due to an external magnetic field. Accordingly, the energy required for AC magnetization is further reduced, and the iron loss of the soft magnetic alloy ribbon 1 can be further reduced.

The soft magnetic alloy ribbon 1 does not necessarily have to satisfy the relation of D0<D2, but the relation of D0<D2 is preferably satisfied from the viewpoint of reducing the iron loss of the entire soft magnetic alloy ribbon 1.

The relation of D0<D1 and the relation of D0<D2 as described above do not have to be satisfied in the entire soft magnetic alloy ribbon 1, but may be satisfied in at least a part thereof. Specifically, it is preferable that the relations are satisfied in a range of 30% or more, and more preferably satisfied in a range of 50% or more in terms of area ratio.

As described above, the direction in which the laser peening trace rows 16 are arranged is the second direction β, and the direction in which the domain wall 2 extends is the third direction γ. In the present embodiment, the second direction β and the third direction γ are parallel to each other.

Accordingly, for example, when the laser peening trace rows 16 are arranged along the length direction Y of the soft magnetic alloy ribbon 1, the domain wall 2 also extends along the length direction Y. Thus, since the axis of easy magnetization of the soft magnetic alloy ribbon 1 is the same as the length direction Y, when the magnetic core is prepared by winding the soft magnetic alloy ribbon 1, the axis of easy magnetization is the same as the circumferential direction of the magnetic core. As a result, for example, a soft magnetic alloy ribbon 1 suitable for a wound iron core or the like can be obtained.

The widths D0, D1 and D2 of the domain wall 2 are preferably 50 nm or less, more preferably 2 nm or more and 40 nm or less, and still more preferably 10 nm or more and 30 nm or less. This makes the domain wall 2 particularly easy to move due to an external magnetic field.

The ratio of D1<D0 and the ratio of D0<D2 are each more than 1, and preferably 2 or more, and more preferably 2 or more and 5 or less. Accordingly, the iron loss of the soft magnetic alloy ribbon 1 can be particularly reduced.

The widths D1 and D2 of the domain wall 2 may be the same as or different from each other.

The widths D0, D1 and D2 of the domain wall 2 can be measured by a transmission electron microscope. In particular, it can be measured by an electron holography, a Lorenz microscope method, or the like using the transmission electron microscope. In particular, by using the electron holography, the widths D0, D1 and D2 of the domain wall 2 can be measured more accurately. Specifically, an electron beam hologram is imaged with the transmission electron microscope, then phase information of electrons is reproduced to obtain a phase reproduction image. Next, a phase change on a line crossing the domain wall 2 is acquired based on the phase reproduction image. Next, the widths D0, D1 and D2 of the domain wall 2 can be estimated by performing a first derivative of the obtained phase change.

The spacing between the first laser peening trace row 161 and the second laser peening trace row 162, that is, the line spacing d1, is preferably 1 mm or more and 40 mm or less, as described above. When the line spacing d1 is within the above range, an arrangement density of the laser peening trace rows 16 in the soft magnetic alloy ribbon 1 can be optimized. As a result, the magnetic domains 3 can be satisfactorily refined, and the iron loss of the soft magnetic alloy ribbon 1 can be further reduced.

The spacing between the laser peening traces 15 in the laser peening trace row 16 including the first laser peening trace row 161 and the second laser peening trace row 162, that is, the spot spacing d2 is preferably 1.0 mm or less, as described above. When the spot spacing d2 is within the above range, the arrangement density of the laser peening traces 15 in the laser peening trace row 16 can be optimized. As a result, the magnetic domains 3 can be satisfactorily refined, and the iron loss of the soft magnetic alloy ribbon 1 can be further reduced.

The width of the magnetic domain 3 after refinement, that is, the length of the magnetic domain 3 in the first direction $\alpha$ is not particularly limited, and is preferably 5 mm or less, more preferably 0.05 mm or more and 3 mm or less, and still more preferably 0.1 mm or more and 1 mm or less.

1.3. Iron Loss

In the soft magnetic alloy ribbon 1 according to the present embodiment, as described above, the iron loss is reduced.

Specifically, the iron loss of the soft magnetic alloy ribbon 1 under conditions of a frequency of 50 Hz and a magnetic flux density of 1.2 T is preferably 0.05 W/kg or less, more preferably 0.04 W/kg or less, and still more preferably 0.02 W/kg or less.

When the soft magnetic alloy ribbon 1 having such a low iron loss is used for a transformer or the like, the soft magnetic alloy ribbon 1 contributes to high efficiency of the transformer. For example, when the soft magnetic alloy ribbon 1 having such a low iron loss is used for a motor core or the like, the soft magnetic alloy ribbon 1 contributes to improvement of conversion efficiency. The iron loss is measured by, for example, sinusoidal excitation using an AC magnetic measuring instrument.

1.4. Modification

Next, soft magnetic alloy ribbons according to modifications will be described.

Figure 5:
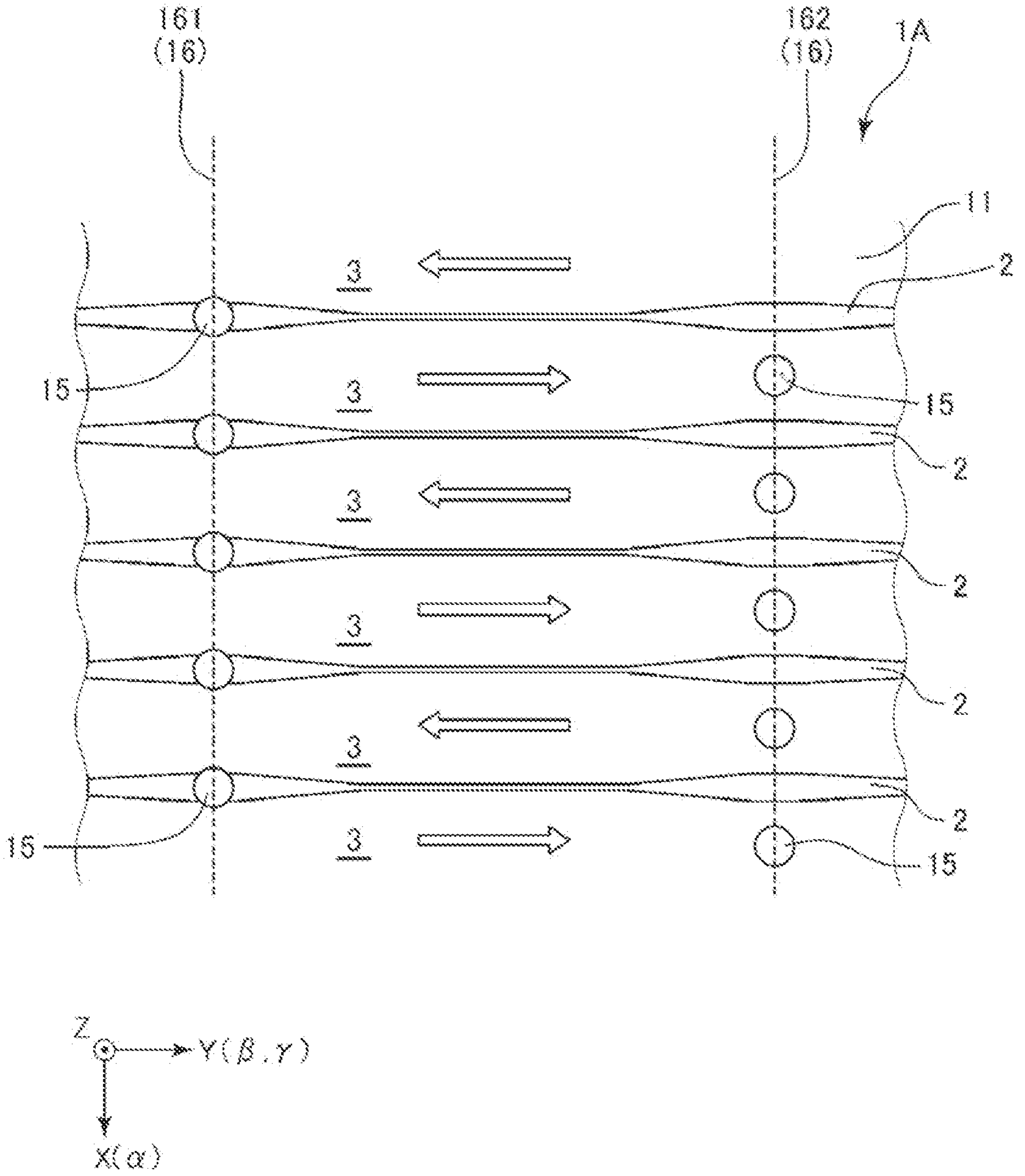
FIG. 5 is an enlarged plan view showing a first surface of a soft magnetic alloy ribbon according to a first modification, and is a diagram schematically showing magnetic domains and domain walls of the soft magnetic alloy ribbon.

FIG. 5 is an enlarged plan view showing the first surface 11 of a soft magnetic alloy ribbon 1A according to a first modification, and is a diagram schematically showing the magnetic domains 3 and the domain walls 2 of the soft magnetic alloy ribbon 1A.

The soft magnetic alloy ribbon 1A shown in FIG. 5 is the same as the soft magnetic alloy ribbon 1 shown in FIG. 4 except that the positions of the laser peening traces 15 constituting the second laser peening trace row 162 in the width direction X are deviated from the domain walls 2.

As described above, since the domain walls 2 are provided regardless of the positions of the laser peening traces 15, as shown in FIG. 5, the domain walls 2 may intersect the second laser peening trace row 162 at a position where the laser peening traces 15 do not exist.

Figure 6:
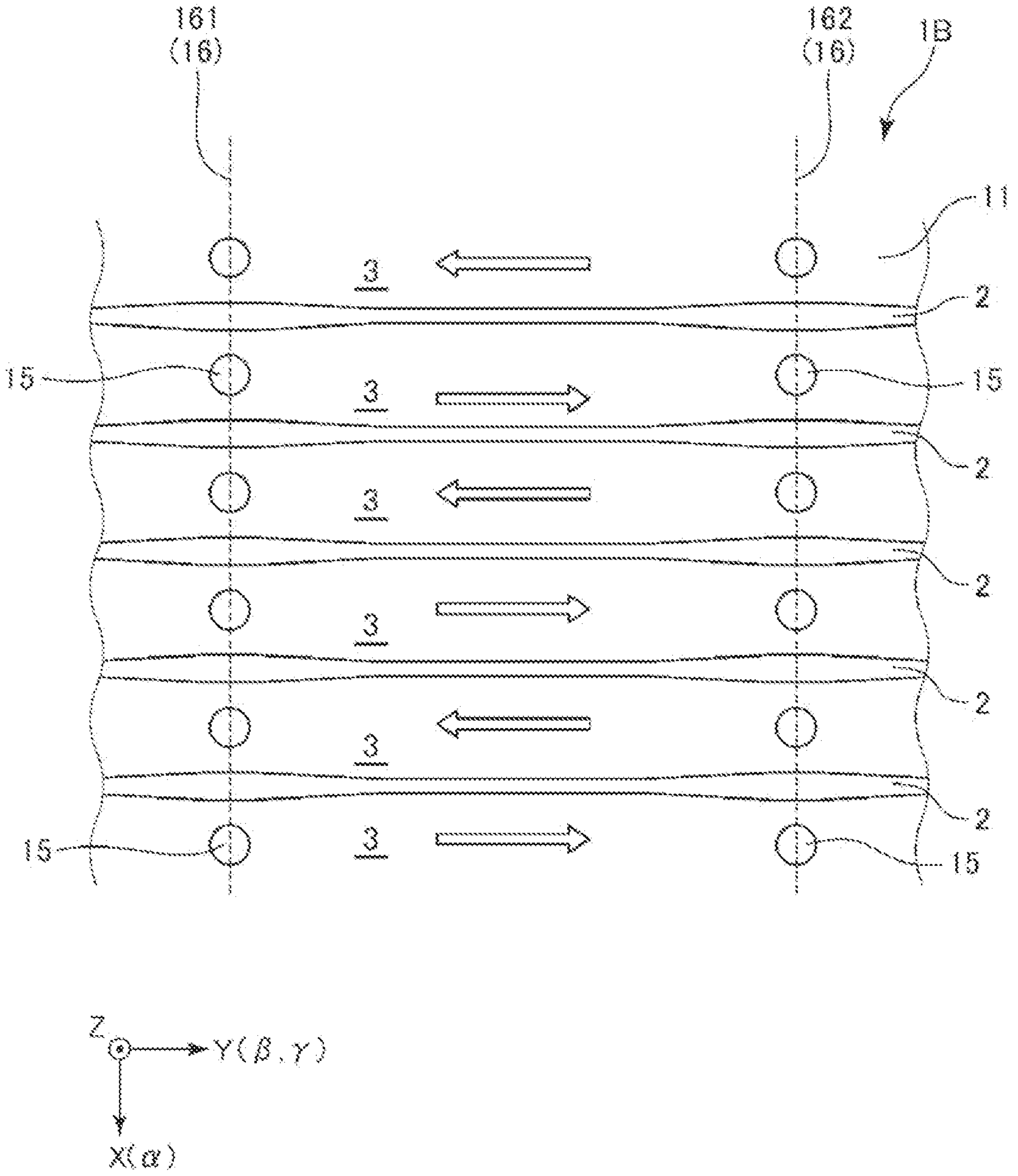
FIG. 6 is an enlarged plan view showing a first surface of a soft magnetic alloy ribbon according to a second modification, and is a diagram schematically showing magnetic domains and domain walls of the soft magnetic alloy ribbon.

FIG. 6 is an enlarged plan view showing the first surface 11 of a soft magnetic alloy ribbon 1B according to a second modification, and is a diagram schematically showing the magnetic domains 3 and the domain walls 2 of the soft magnetic alloy ribbon 1B.

The soft magnetic alloy ribbon 1B shown in FIG. 6 is the same as the soft magnetic alloy ribbon 1A shown in FIG. 5 except that the positions of the laser peening traces 15 constituting the first laser peening trace row 161 in the width direction X are deviated from the domain walls 2.

As shown in FIG. 6, the domain walls 2 may intersect the first laser peening trace row 161 at a position where the laser peening trace 15 does not exist.

Even in the above-described modifications, the same effect as that of the above-described embodiments can be obtained.

2. Method for Manufacturing Soft Magnetic Alloy Ribbon

Next, an example of a method for manufacturing the soft magnetic alloy ribbon will be described.

Figure 7:
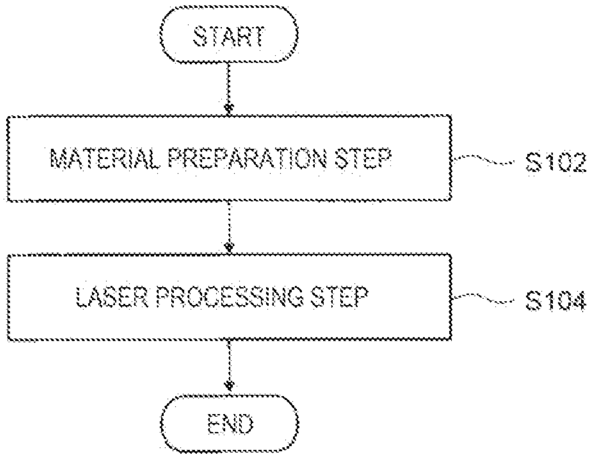
FIG. 7 is a flowchart illustrating an example of a method for manufacturing the soft magnetic alloy ribbon.

FIG. 7 is a flowchart illustrating an example of a method for manufacturing the soft magnetic alloy ribbon.

The method for manufacturing the soft magnetic alloy ribbon shown in FIG. 7 includes a material preparation step S102 and a laser processing step S104. In the material preparation step S102, a material ribbon made of a soft magnetic alloy is prepared. In the laser processing step S104, laser processing is performed on one main surface of the material ribbon. Accordingly, a laser peening trace row including a plurality of laser peening traces arranged in a row is formed. Then, if necessary, a heat treatment is performed under a magnetic field. Accordingly, the soft magnetic alloy ribbon is obtained.

2.1. Material Preparation Step

The material ribbon is manufactured by, for example, a method for manufacturing a rapidly solidified ribbon, such as a single roll method. The material preparation step S102 may be a step of manufacturing the material ribbon by such a manufacturing method, may include a step of cutting the material ribbon manufactured by the manufacturing method described above into a necessary length, or may be a step of only preparing the material ribbon.

2.2. Laser Processing Step

In the laser processing step S104, the laser processing is performed on at least one main surface of the material ribbon to form the laser peening trace. The arrangement of the laser peening traces is the same as the arrangement of the laser peening traces 15 in the soft magnetic alloy ribbon 1 described above.

Conditions in the laser processing vary depending on the alloy composition and the like of the material ribbon. As an example, an output of laser in the laser processing is preferably 0.4 mJ or more and 2.5 mJ or less, and more preferably 1.0 mJ or more and 2.0 mJ or less.

A diameter of a laser beam in the laser processing influences the spot diameter d3 described above. As an example, the diameter of the laser beam is preferably 0.010 mm or more and 0.30 mm or less, and more preferably 0.020 mm or more and 0.25 mm or less.

An energy density of the laser in the laser processing influences the spot diameter d3 and the spot depth d4 of the laser peening trace 15 described above. As an example, the energy density of the laser is preferably 0.01 J/mm$^2$ or more and 1.50 J/mm$^2$ or less, and more preferably 0.03 J/mm$^2$ or more and 1.00 J/mm$^2$ or less.

A wavelength of the laser in the laser processing is, for example, preferably 250 nm or more and 1100 mm or less, and more preferably 900 nm or more and 1100 nm or less.

A laser light source used in the laser processing includes, for example, a YAG laser, a CO2 gas laser, a semiconductor laser, and a fiber laser. Among these, from the viewpoint of being capable of emitting high-frequency pulsed laser light with a high output, the fiber laser is preferably used. A pulse width of the pulsed laser light is preferably 50 nanoseconds or more, and more preferably 100 nanoseconds or more. The pulse width is a time during which laser irradiation is performed, and when the pulse width is smaller, the irradiation time is shorter. When the pulse width is set within the above range, the laser peening trace 15 having an appropriate size and depth can be efficiently formed.

The widths D0, D1 and D2 of the domain wall 2 can be adjusted according to, for example, the energy density (power) of the laser, the pulse width of the pulsed laser light, a temperature and a cooling rate of the rapidly solidified ribbon, and the line spacing d1. Specifically, the compressive stress around the laser peening trace 15 can be increased by increasing the energy density of the laser or increasing the pulse width. Accordingly, the widths D1 and D2 of the domain wall 2 can be widened. The widths D0, D1 and D2 of the domain wall 2 can be widened even when the temperature of the rapidly solidified ribbon is increased or the cooling rate is increased. On the other hand, by widening the line spacing d1, the width D0 of the domain wall 2 can be narrowed.

3. Magnetic Core

Next, a magnetic core according to the embodiment will be described.

Figure 8:
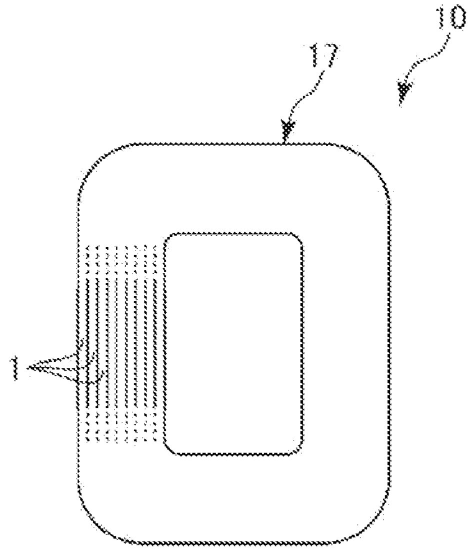
FIG. 8 is a schematic view showing a magnetic core according to the embodiment.

FIG. 8 is a schematic view showing a magnetic core according to the embodiment.

A magnetic core 10 shown in FIG. 8 includes a laminated body 17 in which a plurality of soft magnetic alloy ribbons 1 are laminated. Specifically, the magnetic core 10 shown in FIG. 8 which is annular is formed by curving the laminated body 17 and overlapping and wrapping both ends of the laminated body 17. A well-known overlapping and wrapping method is used as the overlapping and wrapping method.

A shape of the magnetic core 10 is not limited to the shape shown in FIG. 8, and may be any shape.

It is preferable that the soft magnetic alloy ribbons 1 provided in the laminated body 17 are insulated from each other. For the insulation, for example, a resin coating can be used.

As described above, the magnetic core 10 includes the above-mentioned soft magnetic alloy ribbon 1. Accordingly, the magnetic core 10 with a low iron loss can be obtained. Such a magnetic core 10 is suitably used for, for example, a power distribution transformer, a high frequency transformer, a saturable reactor, a magnetic switch, a choke coil, a motor, and a generator.

The soft magnetic alloy ribbon and the magnetic core according to the present disclosure have been described above based on preferred embodiments, but the present disclosure is not limited thereto. For example, the soft magnetic alloy ribbon and the magnetic core according to the present disclosure may have any constituent added to the above embodiments.

EXAMPLES

Next, specific examples of the present disclosure will be described.

4. Manufacturing of Soft Magnetic Alloy Ribbon 4.1. Sample No. 1

First, a material ribbon made of a soft magnetic alloy having an alloy composition of $Fe_{82}Si_4B_{14}$ and having a thickness of 25 μm and a width of 210 mm was manufactured by a single roll method. $Fe_{82}Si_4B_{14}$ means an alloy composition in which when the total content of Fe, Si, and B is 100 atomic %, the Fe content is 82 atomic %, the Si content is 4 atomic %, and the B content is 14 atomic %.

Next, a sample piece having a size of a length of 120 mm and a width of 25 mm was cut out from the manufactured material ribbon.

Next, one main surface of the cut sample piece was subjected to a laser scribe treatment to form a laser peening trace. As shown in FIG. 1, a laser peening trace row including the laser peening trace was formed over the entire width direction of the material ribbon. Accordingly, as shown in FIG. 4, a soft magnetic alloy ribbon of sample No. 1 having a domain wall having a partially different width was obtained.

Next, a heat treatment was performed at 340° C. for 1 hour while applying a magnetic field of 1.6 kA/m in the length direction of the soft magnetic alloy ribbon.

Next, the widths D0, D1 and D2 of the domain wall were measured by an electron holography using the transmission electron microscope. Measurement results are shown in Table 1.

4.2. Sample Nos. 2 to 17

The soft magnetic alloy ribbon of each sample No. was obtained in the same manner as in the case of the soft magnetic alloy ribbon of sample No. 1, except that the processing conditions in the laser scribe treatment were changed to obtain the values of the widths D0, D1 and D2 of the domain wall shown in Table 1.

4.3. Sample Nos. 18 to 21

The soft magnetic alloy ribbon of each sample No. was obtained in the same manner as in the case of the soft magnetic alloy ribbon of sample No. 1, except that the processing conditions in the laser scribe treatment were changed to obtain the values of the width D0, D1 and D2 of the domain wall shown in Table 2. The widths D1 and D2 of the domain wall were made different from each other.

In Tables 1 and 2, the soft magnetic alloy ribbon corresponding to the present disclosure is referred to as "Example", and a soft magnetic alloy ribbon not corresponding to the present disclosure is referred to as "Comparative Example".

5. Evaluation of Soft Magnetic Alloy Ribbon

For the soft magnetic alloy ribbon of each Example and each Comparative Example, the iron loss was measured under the conditions of a frequency of 50 Hz and a magnetic flux density of 1.2 T. Then, measurement results were evaluated in light of the following evaluation criteria.

A: the iron loss is 0.02 W/kg or less

B: the iron loss is more than 0.02 W/kg and 0.05 W/kg or less

C: the iron loss is more than 0.05 W/kg

The evaluation results are shown in Tables 1 and 2.

TABLE 1

| | | Width of domain wall | | | Domain wall width ratio | | Evaluation |
|---|---|---|---|---|---|---|---|
| | | D0 [nm] | D1 [nm] | D2 [nm] | D1/D0 | D2/D0 | result Iron loss |
| Sample No. 1 | Comparative Example | 16.0 | 10.0 | 10.0 | 0.63 | 0.63 | C |
| Sample No. 2 | Comparative Example | 25.0 | 6.0 | 6.0 | 0.24 | 0.24 | C |
| Sample No. 3 | Comparative Example | 22.0 | 19.0 | 19.0 | 0.86 | 0.86 | C |
| Sample No. 4 | Comparative Example | 27.0 | 17.0 | 17.0 | 0.63 | 0.63 | C |
| Sample No. 5 | Comparative Example | 33.0 | 8.0 | 8.0 | 0.24 | 0.24 | C |
| Sample No. 6 | Comparative Example | 39.0 | 20.0 | 20.0 | 0.51 | 0.51 | C |
| Sample No. 7 | Comparative Example | 42.0 | 35.0 | 35.0 | 0.83 | 0.83 | C |
| Sample No. 8 | Example | 18.0 | 25.0 | 25.0 | 1.39 | 1.39 | B |
| Sample No. 9 | Example | 28.0 | 40.0 | 40.0 | 1.43 | 1.43 | B |
| Sample No. 10 | Example | 22.0 | 28.0 | 28.0 | 1.27 | 1.27 | B |
| Sample No. 11 | Example | 29.0 | 36.0 | 36.0 | 1.24 | 1.24 | B |
| Sample No. 12 | Example | 36.0 | 50.0 | 50.0 | 1.39 | 1.39 | B |
| Sample No. 13 | Example | 45.0 | 60.0 | 60.0 | 1.33 | 1.33 | B |
| Sample No. 14 | Example | 20.0 | 55.0 | 55.0 | 2.75 | 2.75 | A |
| Sample No. 15 | Example | 15.0 | 38.0 | 38.0 | 2.53 | 2.53 | A |
| Sample No. 16 | Example | 8.0 | 32.0 | 32.0 | 4.00 | 4.00 | A |
| Sample No. 17 | Example | 9.0 | 25.0 | 25.0 | 2.78 | 2.78 | A |

TABLE 2

| | | Width of domain wall | | | Domain wall width ratio | | Evaluation result |
|---|---|---|---|---|---|---|---|
| | | D0 [nm] | D1 [nm] | D2 [nm] | D1/D0 | D2/D0 | Iron loss |
| Sample No. 18 | Example | 18.0 | 20.0 | 30.0 | 1.11 | 1.67 | B |
| Sample No. 19 | Example | 29.0 | 55.0 | 32.0 | 1.90 | 1.10 | B |
| Sample No. 20 | Example | 20.0 | 45.0 | 60.0 | 2.25 | 3.00 | A |
| Sample No. 21 | Example | 9.0 | 30.0 | 20.0 | 3.33 | 2.22 | A |

As is clear from Tables 1 and 2, the soft magnetic alloy ribbons of Examples have an iron loss lower than that of the soft magnetic alloy ribbons of Comparative Examples. Thus, it has been found that, according to the present disclosure, a soft magnetic alloy ribbon from which a magnetic core having a low iron loss can be manufactured can be implemented.

Figure 9:
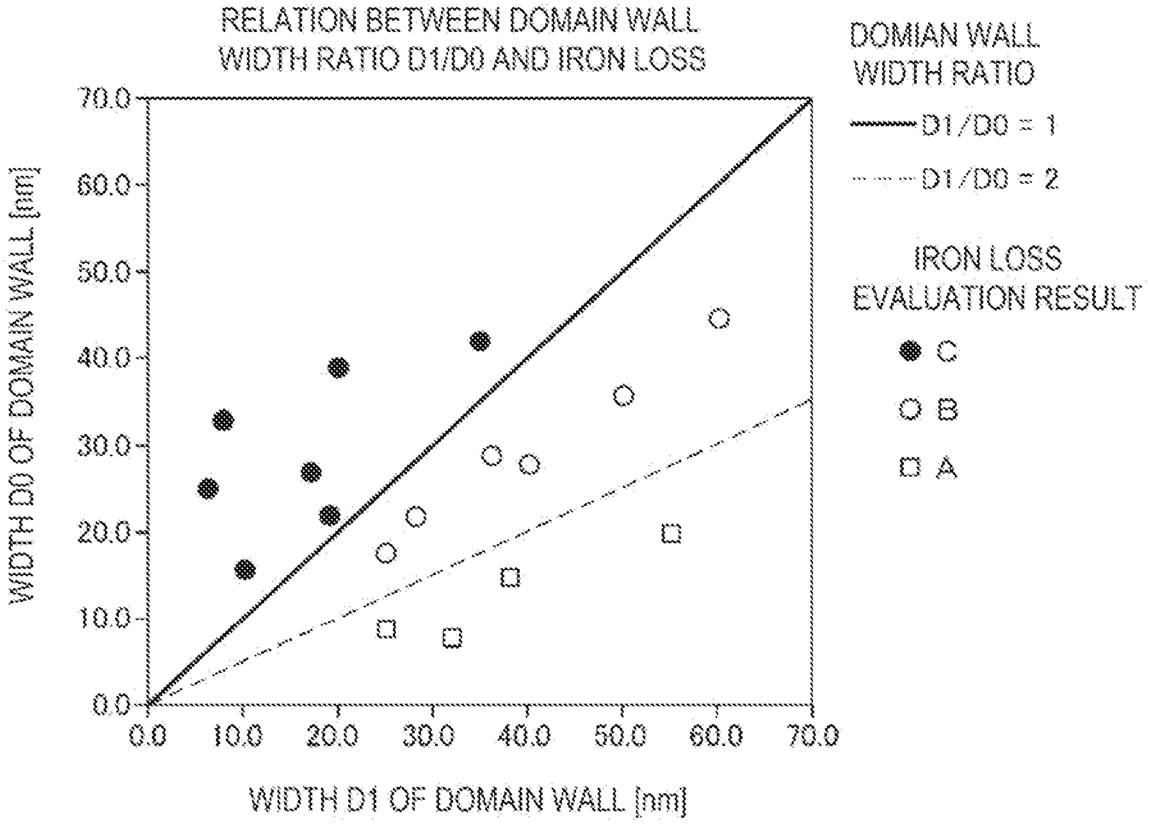
FIG. 9 is a graph created by plotting data of widths D0 and D1 of a domain wall in a soft magnetic alloy ribbon of each sample No. shown in Table 1 in an orthogonal coordinate system with the width D1 of the domain wall on a horizontal axis and the width D0 of the domain wall on a vertical axis.

Here, the widths D0 and D1 of the domain wall shown in Table 1 were plotted in an orthogonal coordinate system to create a graph. FIG. 9 is a graph created by plotting the data of the widths D0 and D1 of the domain wall in the soft magnetic alloy ribbon of each sample No. shown in Table 1 in the orthogonal coordinate system with the width D1 of the domain wall on the horizontal axis and the width D0 of the domain wall on the vertical axis. In the graph of FIG. 9, the types of plot marks are changed based on the above evaluation results. In FIG. 9, auxiliary lines are drawn at positions where a domain wall width ratio D1/D0 is 1 and at positions where a domain wall width ratio D1/D0 is 2.

In FIG. 9, if the domain wall width ratio D1/D0 is more than 1, the iron loss evaluation result is B or more, and if the domain wall width ratio D1/D0 is 2 or more, the iron loss evaluation result is A. From the results, it is confirmed that the iron loss can be further reduced by optimizing the domain wall width ratio D1/D0. It is considered that the same applies to a domain wall width ratio D2/D0.

What is claimed is:

1. A soft magnetic alloy ribbon made of a Fe-based soft magnetic alloy, the soft magnetic alloy ribbon comprising:

a first laser peening trace row and a second laser peening trace row each of which includes a plurality of laser peening traces in a row in a first direction and which are arranged adjacent to each other in a second direction intersecting the first direction; and a domain wall extending in a third direction intersecting the first direction, wherein $D0<D1$ where a straight line at an equal separation distance from the first laser peening trace row and the second laser peening trace row is defined as a central line, a straight line which is located on a central line side of the first laser peening trace row and has a first distance where a distance from the first laser peening trace row is shorter than the separation distance is defined as a first reference line, a width of the domain wall at a position intersecting the central line is defined as D0, a width of the domain wall at a position intersecting the first reference line is defined as D1, a width of the soft magnetic alloy ribbon is 5 mm or more and 500 mm or less, a thickness of the soft magnetic alloy ribbon is 1 μm or more and 40 μm or less, the Fe-based soft magnetic alloy is an Fe—SI—B alloy or an Fe—Si—B—C alloy, the Fe-based soft magnetic alloy contains at least one of an amorphous structure and a nanocrystalline structure in a total of 50 volume % or more, the spot spacing between the laser peening traces is 1.0 mm or less, the spot diameter of the laser peening traces is 0.010 mm or more and 0.30 mm or less, and the spot depth of the laser peening traces is 0.0020 mm or more and 0.15 mm or less.

2. The soft magnetic alloy ribbon according to claim 1, wherein $D0<D2$ where a straight line which is located on the central line side of the second laser peening trace row and has a second distance where a distance from the second laser peening trace row is shorter than the separation distance is defined as a second reference line, and a width of the domain wall at a position intersecting the second reference line is defined as D2.

3. The soft magnetic alloy ribbon according to claim 1, wherein the second direction and the third direction are parallel to each other.

4. The soft magnetic alloy ribbon according to claim 1, wherein a spacing between the first laser peening trace row and the second laser peening trace row is 1 mm or more and 40 mm or less.

5. The soft magnetic alloy ribbon according to claim 1, wherein an iron loss under conditions of a frequency of 50 Hz and a magnetic flux density of 1.2 T is 0.05 W/kg or less.

6. A magnetic core, comprising:

the soft magnetic alloy ribbon according to claim 1.

* * * * *